US010868847B2

(12) United States Patent
Ikegami

(10) Patent No.: US 10,868,847 B2
(45) Date of Patent: Dec. 15, 2020

(54) INFORMATION PROCESSING APPARATUS, CONTROL METHOD THEREFOR AND STORAGE MEDIUM

(71) Applicant: CANON KABUSHIKI KAISHA, Tokyo (JP)

(72) Inventor: Hideyuki Ikegami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 16/120,724

(22) Filed: Sep. 4, 2018

(65) Prior Publication Data

US 2019/0081999 A1    Mar. 14, 2019

(30) Foreign Application Priority Data

Sep. 8, 2017    (JP) ................. 2017-173222

(51) Int. Cl.
*H04L 29/06*    (2006.01)
*H04L 29/08*    (2006.01)
(Continued)

(52) U.S. Cl.
CPC ...... *H04L 65/601* (2013.01); *H04L 29/06462* (2013.01); *H04L 65/602* (2013.01);
(Continued)

(58) Field of Classification Search
CPC ......... H04L 29/00; H04L 29/02; H04L 29/06; H04L 29/0602; H04L 29/06027;
(Continued)

(56) References Cited

U.S. PATENT DOCUMENTS 5,815,793 A * 9/1998 Ferguson ............... H04N 7/173
                                          348/E5.006
6,253,245 B1 * 6/2001 Helbig .................... H04L 29/06
                                            375/E7.02
(Continued)

FOREIGN PATENT DOCUMENTS

CN       104349221 A     2/2015
CN       104380723 A     2/2015
(Continued)

OTHER PUBLICATIONS

Extended European Search Report issued in European Appln. No. 18191376.5 dated Jan. 11, 2019.
(Continued)

*Primary Examiner* — Boris D Grijalva Lobos
(74) *Attorney, Agent, or Firm* — Rossi, Kimms & McDowell LLP

(57) ABSTRACT

An information processing apparatus for executing reception processing of receiving a video from an external apparatus determines a reception state of the video from the external apparatus by requesting the external apparatus to send the video. The information processing apparatus executes, based on a result of determining the reception state, one of a stream reception operation of receiving a video stream by sending a stream request to the external apparatus and an individual reception operation of individually receiving an image included in the video stream by sending an individual request to the external apparatus.

12 Claims, 12 Drawing Sheets

(51) Int. Cl.
　　*H04N 21/231* (2011.01)
　　*H04N 5/232* (2006.01)
　　*H04N 21/239* (2011.01)
　　*H04N 7/18* (2006.01)

(52) U.S. Cl.
　　CPC ............ *H04L 65/607* (2013.01); *H04L 67/06* (2013.01); *H04L 67/28* (2013.01); *H04L 67/32* (2013.01); *H04N 5/232* (2013.01); *H04N 5/23206* (2013.01); *H04N 21/2393* (2013.01); *H04N 21/23103* (2013.01); *H04L 67/42* (2013.01); *H04N 7/18* (2013.01)

(58) Field of Classification Search
　　CPC ......... H04L 29/06163; H04L 29/06176; H04L 29/06448; H04L 29/06462; H04L 51/00; H04L 51/06–066; H04L 65/00; H04L 65/4069; H04L 65/4084; H04L 65/4092; H04L 65/60–605; H04L 65/607; H04L 67/00; H04L 67/06; H04L 67/28; H04L 67/2809; H04L 67/2842; H04L 67/32; H04L 67/42
　　See application file for complete search history.

(56) References Cited

U.S. PATENT DOCUMENTS

| | | | | |
|---|---|---|---|---|
| 6,717,936 | B1* | 4/2004 | Srinivasan | H04L 12/5692 370/352 |
| 6,771,594 | B1* | 8/2004 | Upadrasta | H04L 29/06027 370/228 |
| 6,965,926 | B1* | 11/2005 | Shapiro | G06Q 10/107 709/219 |
| 7,088,467 | B1* | 8/2006 | Voss | H04N 1/40068 345/419 |
| 7,369,537 | B1* | 5/2008 | Kirchhoff | H04L 12/66 370/352 |
| 7,548,332 | B2* | 6/2009 | Kajiwara | H04L 12/66 358/1.15 |
| 7,945,688 | B1* | 5/2011 | Lango | H04L 65/605 709/203 |
| 7,953,888 | B2* | 5/2011 | Ricciulli | F25B 41/003 709/239 |
| 8,983,472 | B2* | 3/2015 | Karaoguz | H04L 29/06027 370/331 |
| 9,021,134 | B1* | 4/2015 | Patel | H04L 67/2823 709/246 |
| 9,569,232 | B1* | 2/2017 | Brandwine | G06F 9/455 |
| 2002/0007418 | A1* | 1/2002 | Hegde | H04L 29/06027 709/231 |
| 2005/0090283 | A1* | 4/2005 | Rodriquez | H04W 72/0413 455/552.1 |
| 2005/0141528 | A1* | 6/2005 | Matsuhashi | H04M 3/54 370/401 |
| 2006/0168626 | A1* | 7/2006 | Vorlicek | H04N 21/41407 725/62 |
| 2007/0011338 | A1* | 1/2007 | Glatron | G06Q 10/10 709/228 |
| 2007/0043875 | A1* | 2/2007 | Brannon, Jr. | H04L 67/34 709/231 |
| 2008/0056139 | A1* | 3/2008 | Liaqat | H04L 43/00 370/242 |
| 2009/0034416 | A1* | 2/2009 | Baron | H04L 12/4633 370/235 |
| 2009/0323632 | A1* | 12/2009 | Nix | H04L 29/125 370/331 |
| 2010/0005178 | A1* | 1/2010 | Sindelaru | H04L 47/30 709/228 |
| 2011/0257923 | A1* | 10/2011 | Boulton | G01S 5/0221 702/117 |
| 2014/0019604 | A1* | 1/2014 | Twitchell, Jr. | H04L 45/586 709/223 |
| 2014/0019653 | A1* | 1/2014 | Amchislavsky | G06F 13/42 710/106 |
| 2014/0025782 | A1* | 1/2014 | Lu | H04L 29/06476 709/219 |
| 2014/0090003 | A1* | 3/2014 | Eguchi | H04L 65/4076 725/116 |
| 2014/0181179 | A1* | 6/2014 | Clark | H04L 65/608 709/203 |
| 2014/0282023 | A1* | 9/2014 | Mau | H04L 41/22 715/735 |
| 2014/0376875 | A1 | 12/2014 | Iwasaki | |
| 2015/0015719 | A1 | 1/2015 | Campana | |
| 2015/0038184 | A1* | 2/2015 | Macafee | H04W 88/04 455/509 |
| 2015/0120869 | A1* | 4/2015 | Watanabe | H04L 67/06 709/217 |
| 2015/0207834 | A1* | 7/2015 | Zhao | H04N 21/631 709/231 |
| 2015/0256654 | A1* | 9/2015 | Oguchi | H04L 69/08 709/230 |
| 2015/0281303 | A1* | 10/2015 | Yousef | H04N 21/4524 709/219 |
| 2016/0080205 | A1* | 3/2016 | Brown | H04L 41/0853 709/220 |
| 2016/0134674 | A1* | 5/2016 | Fujimori | H04L 65/604 709/219 |
| 2016/0149960 | A1* | 5/2016 | Kato | H04N 7/148 348/14.12 |
| 2016/0337426 | A1* | 11/2016 | Shribman | H04L 65/4084 |
| 2017/0163693 | A1* | 6/2017 | Skuratovich | H04L 65/1069 |
| 2017/0339258 | A1* | 11/2017 | Momchilov | H04L 69/163 |
| 2018/0026811 | A1* | 1/2018 | Herrero | H04L 65/80 370/352 |
| 2018/0227372 | A1* | 8/2018 | Sharma | H04L 12/1859 |
| 2019/0007398 | A1* | 1/2019 | Jaladi | H04L 63/0853 |
| 2019/0081991 | A1* | 3/2019 | Murugesh | H04L 65/1006 |

FOREIGN PATENT DOCUMENTS

| | | |
|---|---|---|
| CN | 105052128 A | 11/2015 |
| CN | 106791680 A | 5/2017 |
| JP | 2008211503 A | 9/2008 |
| TW | 201406158 A | 2/2014 |
| WO | 2013144826 A1 | 10/2013 |
| WO | 2017095649 A1 | 6/2017 |

OTHER PUBLICATIONS

Lin et al. "A fault-tolerant ONVIF protocol extension for seamless surveillance video stream recording." Computer Stardards & Interfaces. 2018: 55-72. vol. 55.
"ONVIF Streaming Specification." ONVIF. Jun. 2017: 1-34. Version 17.06. URL: https://www.onvif.org/specs/stream/ONVIF-Streaming-Spec-v1706.pdf.
Office Action issued in European Appln. No. 18191376.5 dated Aug. 13, 2020.
Office Action issued in Chinese Application No. 201810993475.3 dated Oct. 22, 2020.

* cited by examiner

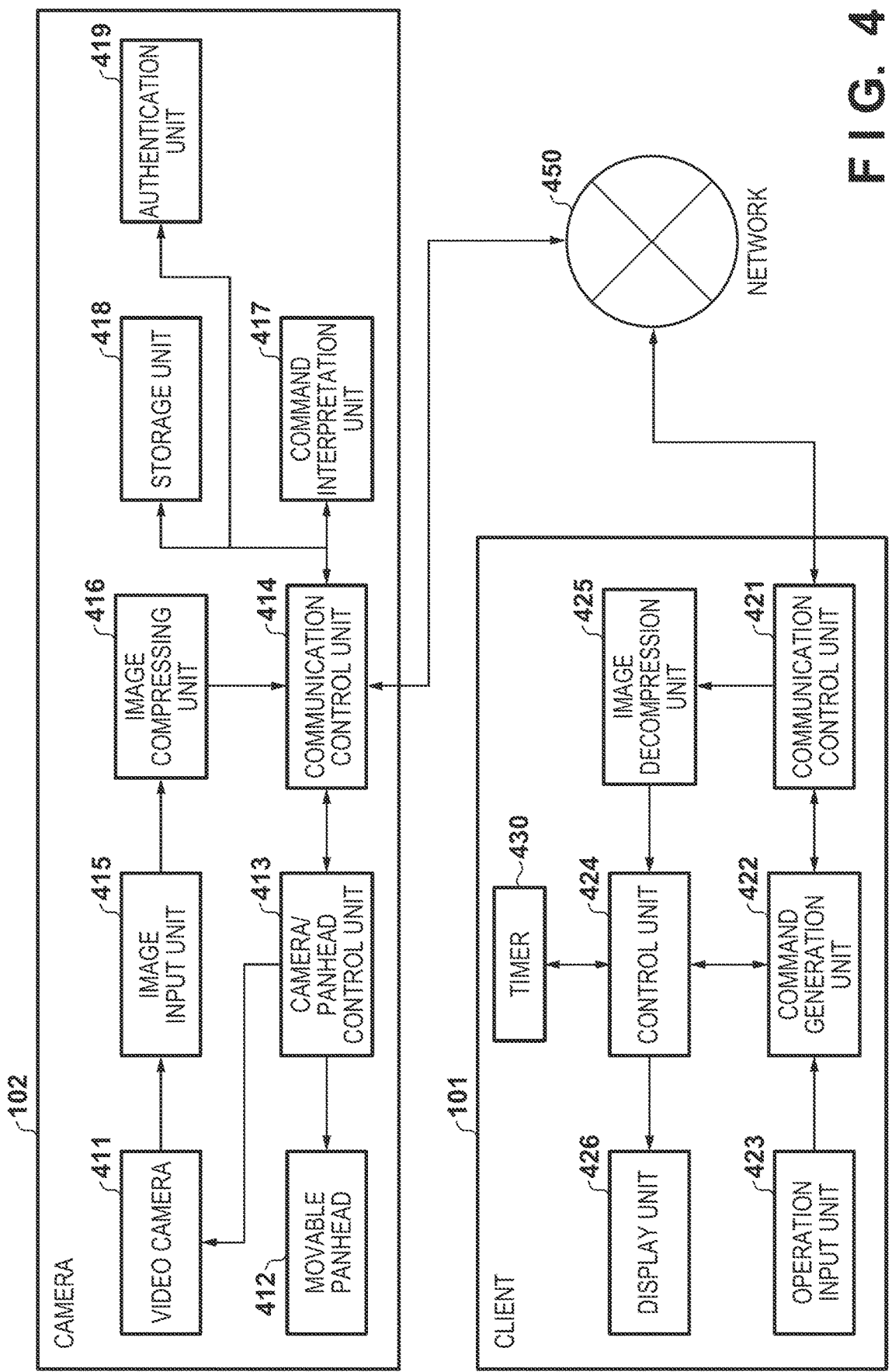

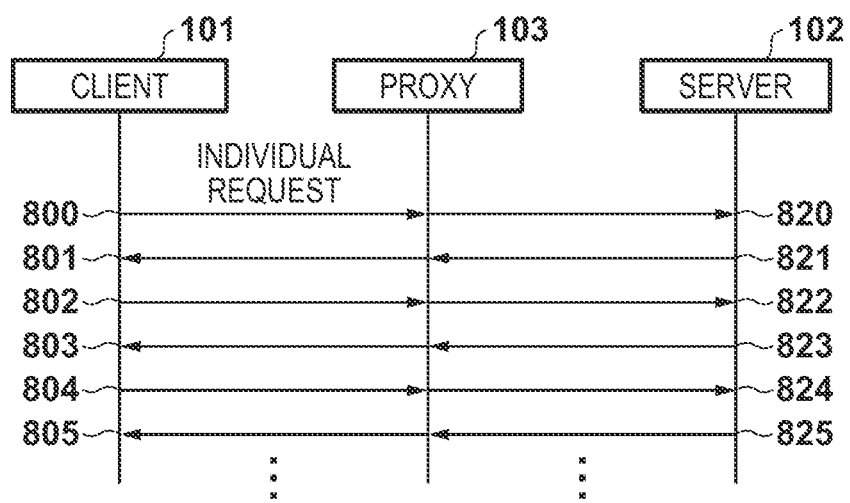
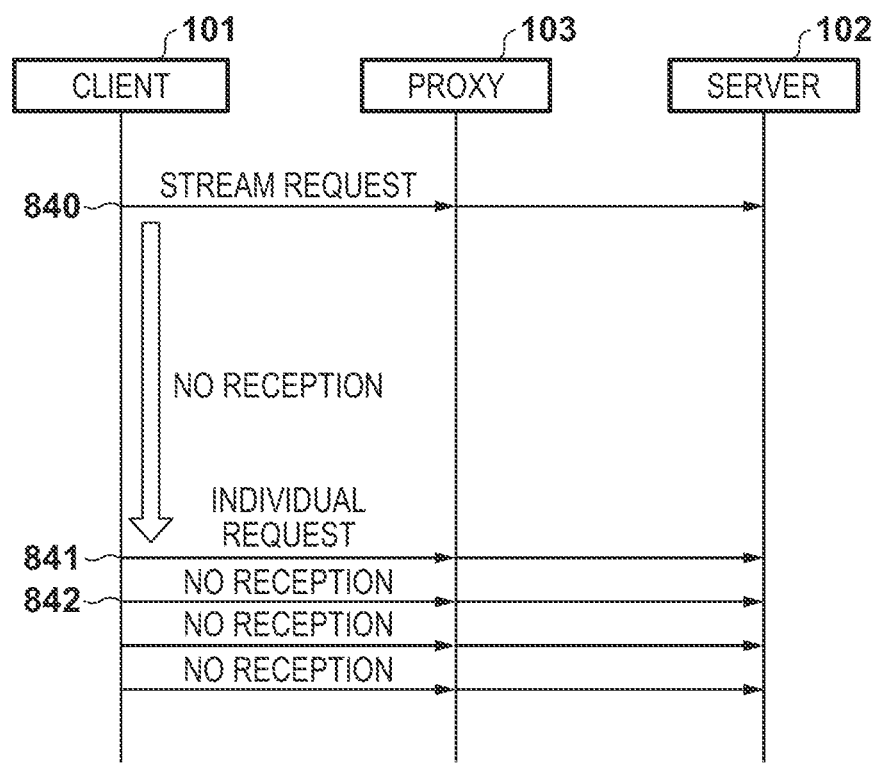

INFORMATION PROCESSING APPARATUS, CONTROL METHOD THEREFOR AND STORAGE MEDIUM

BACKGROUND OF THE INVENTION

Field of the Invention

The present invention relates to an information processing apparatus, a control method therefor and a storage medium.

Description of the Related Art

Video distribution from a network camera includes stream distribution of distributing a plurality of images (video stream) in response to one request from a client and individual distribution of sending one image (individual image) in response to one request from a client. In general, a client that can receive a stream requests stream distribution for high-speed reception, and receives and displays a video stream. On the other hand, a client that cannot receive a stream requests individual distribution, and receives and displays an individual image.

In stream distribution, since a network camera unilaterally distributes data upon receiving a request from a client, high-speed distribution is possible. Therefore, stream distribution is used when it is desirable to display a video at high speed. In individual distribution, an operation in which a network camera receives an individual request from a client and sends an individual image is repeated. Individual distribution allows display even on, for example, a browser regardless of the environment of the client.

There is proposed a client that selects and uses stream distribution or individual distribution in accordance with a situation. Japanese Patent Laid-Open No. 2008-211503 discloses a technique of normally displaying stream distribution and displaying, if an image is disturbed when switching a video stream, an image of individual distribution.

However, if a client requests stream reception, a video stream cannot be received by communication via a proxy in some cases. This is because if data is divisionally sent from an image source, the proxy may accumulate the divided data, receive all the data, and then send all the received data collectively. The divided data of a video stream or the like are sent using, for example, the HTTP chunk format. In the chunk format, each divided data is sent in a format indicating that it is intermediate data or final data. The proxy accumulates the data (intermediate data) until the final data is received from the image source. Then, upon receiving the final data, the proxy sends the data accumulated so far to the client collectively.

If the image source is a camera, intermediate data in the chunk format are successively sent as data (divided data) of a video stream. In this case, since no final data is received, the proxy only accumulates a video received from the camera, and does not send it to the client. As a result, a problem arises in which the video never reaches the client and is not displayed on the client at all.

SUMMARY OF THE INVENTION

In embodiments of the present invention, to solve the above-described problem, there are provided an information processing apparatus that allows a client to receive an image from a camera appropriately, and a control method for the information processing apparatus.

According to one aspect of the present invention, there is provided an information processing apparatus for executing reception processing of receiving a video from an external apparatus, comprising: a determination unit configured to determine a reception state of the video from the external apparatus by requesting the external apparatus to send the video; and an execution unit configured to execute, based on a result of determining the reception state by the determination unit, one of a stream reception operation of receiving a video stream by sending a stream request to the external apparatus and an individual reception operation of individually receiving an image included in the video stream by sending an individual request to the external apparatus.

Furthermore, according to another aspect of the present invention, there is provided a control method for an information processing apparatus for executing reception processing of receiving a video from an external apparatus, comprising: determining a reception state of the video by requesting the external apparatus to send the video; and executing, based on a result of determining the reception state, one of a stream reception operation of receiving a video stream by sending a stream request to the external apparatus and an individual reception operation of individually receiving an image included in the video stream by sending an individual request to the external apparatus.

Furthermore, according to another aspect of the present invention, there is provided a computer readable storage medium storing a program for causing a computer to execute a control method for an information processing apparatus for executing reception processing of receiving a video from an external apparatus, the method comprising: determining a reception state of the video by requesting the external apparatus to send the video; and executing, based on a result of determining the reception state, one of a stream reception operation of receiving a video stream by sending a stream request to the external apparatus and an individual reception operation of individually receiving an image included in the video stream by sending an individual request to the external apparatus.

Further features of the present invention will become apparent from the following description of exemplary embodiments (with reference to the attached drawings).

BRIEF DESCRIPTION OF THE DRAWINGS

FIG. 4 is a block diagram showing an example of the functional arrangements of the camera and client according to an embodiment;

FIGS. 8A and 8B are sequence charts for explaining the operations of the client, proxy, and camera according to the first embodiment;

DESCRIPTION OF THE EMBODIMENTS

First Embodiment

A preferred embodiment of the present invention will be described in detail below with reference to the accompanying drawings.

Figure 1A:
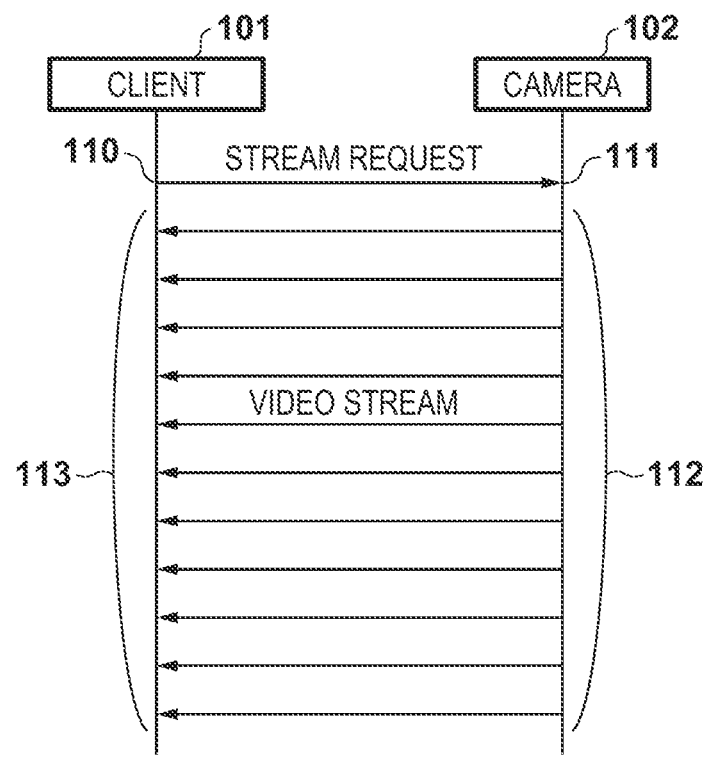
FIG. 1A is a sequence chart for explaining stream distribution of a camera.

Stream distribution and individual distribution according to the embodiment will be described first with reference to FIGS. 1A and 1B. FIG. 1A is a sequence chart when a client receives and displays stream distribution. A client 101 sends a stream request for requesting a video stream (step 110). Upon receiving the stream request (step 111), a camera 102 performs stream distribution (step 112). In stream distribution, a video photographed by the camera 102 is sent as a video stream. The client 101 receives the video stream sent from the camera 102, and displays it (step 113).

Figure 1B:
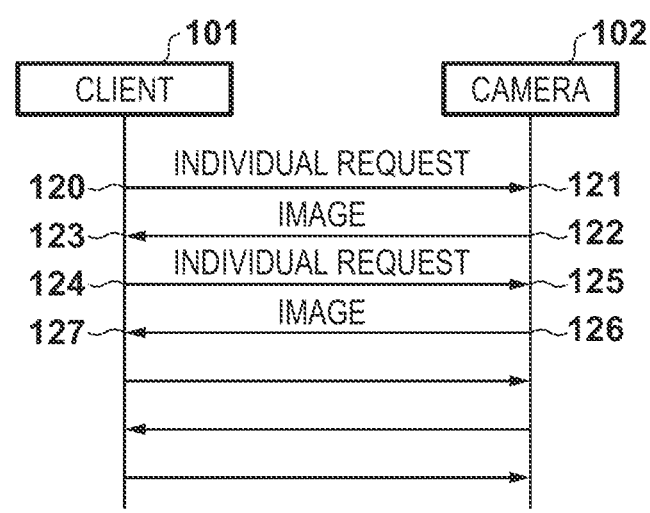
FIG. 1B is a sequence chart for explaining individual distribution of the camera.

FIG. 1B is a sequence chart when the client 101 receives an image individually distributed from the camera 102, and displays it. The client 101 sends an individual request (step 120). Upon receiving the individual request (step 121), the camera 102 performs individual distribution (step 122). In individual distribution, an image (to also be referred to as an individual image hereinafter) of one frame of the video photographed by the camera 102 is distributed. In individual distribution, instead of one frame, images of a plurality of frames such as two or three frames may be requested and distributed. The client 101 receives the image sent by the camera 102, and displays it (step 123). Subsequently, if the client 101 sends a next individual request (step 124), the camera 102 receives the individual request (step 125), and distributes a next image (step 126). The client 101 receives and displays the image (step 127). By repeating this operation, the client 101 displays the images received from the camera 102 by individual distribution.

A case in which a proxy 103 that relays data sending is interposed between the client 101 and the image source, and is set to accumulate divided intermediate data and send them will be described next with reference to FIGS. 2A, 2B, 3A, and 3B.

Figure 2A:
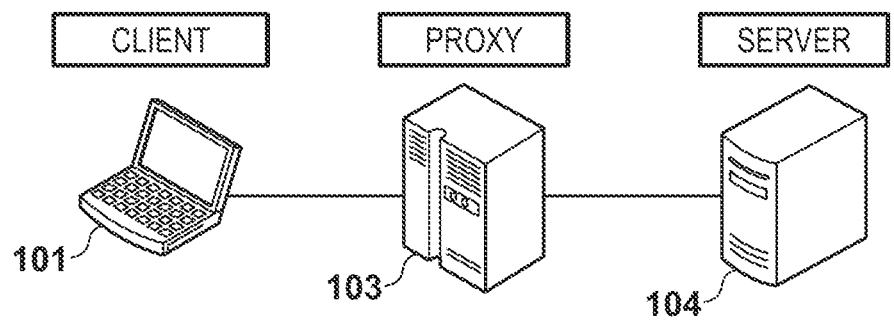
FIGS. 2A and 2B are a view and a sequence chart for explaining a divisional sending operation performed by interposing a proxy.
Figure 2B:
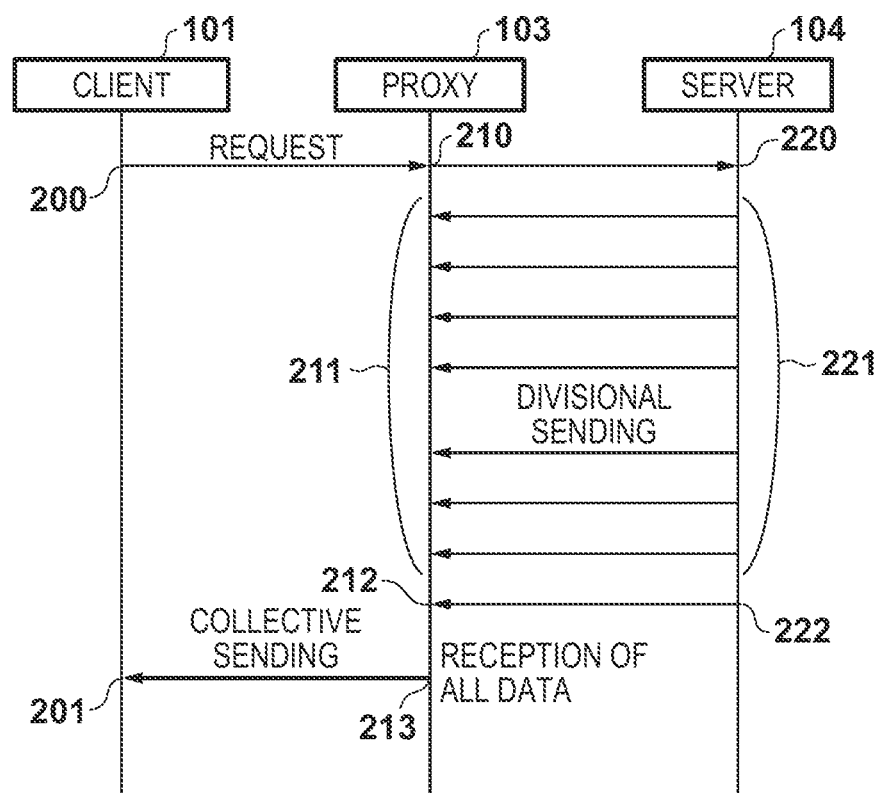

FIG. 2A shows a state in which the client 101 is connected to a server 104 serving as an image source via the proxy 103. FIG. 2B is a sequence chart showing an operation when the proxy 103 set to accumulate intermediate data and send them at once is interposed. First, the client 101 sends a request to the server 104 (step 200). Upon receiving the request, the proxy 103 directly sends the request to the server 104 (step 210). Upon receiving a request (step 220), the server 104 replies to the request by dividing data to be sent and sending the divided data (step 221). The data can be divided and distributed using, for example, the HTTP chunk format. The data sent in step 221 are intermediate data added with no data end information, and the proxy 103 accumulates these data (step 211). After that, the server 104 sends final data indicating the end of the divided data (step 222). Upon receiving the final data (step 212), the proxy 103 sends the accumulated intermediate data and the final data to the client 101 collectively (step 213). Thus, the client 101 receives the divided and sent data collectively (step 201).

Figure 3A:
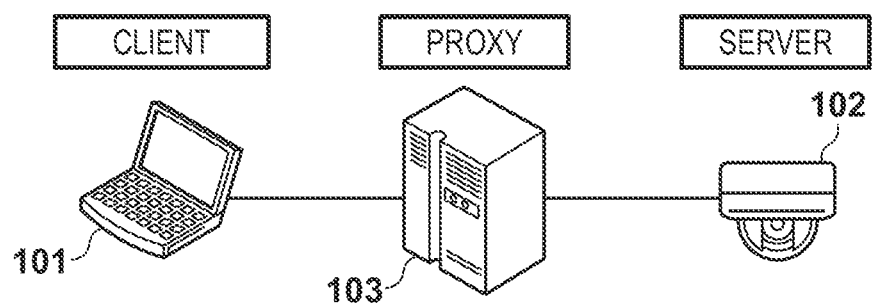
FIGS. 3A and 3B are a view and a sequence chart showing a state in which no video stream reaches a client by interposing the proxy.
Figure 3B:
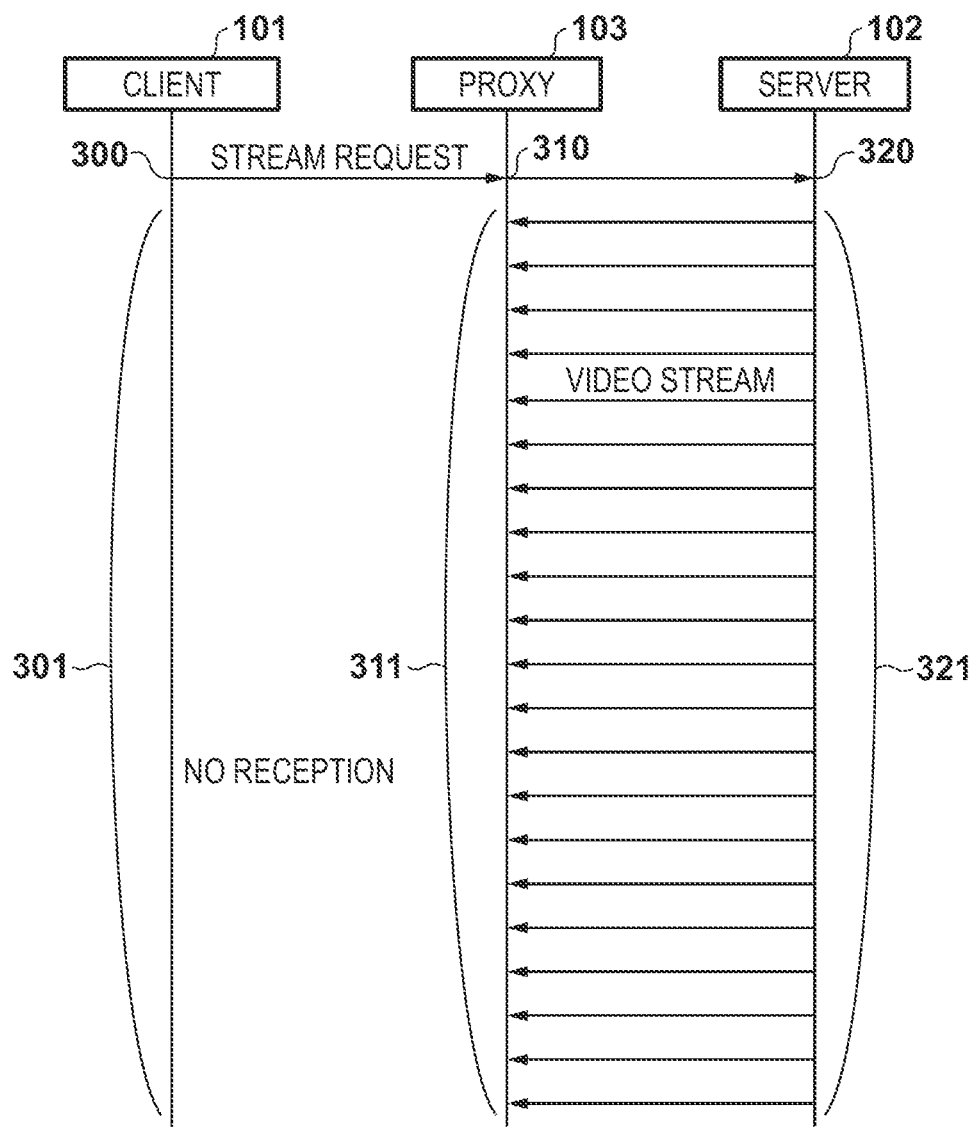

An operation when a video of the camera 102 is to be received, by stream distribution shown in FIG. 1A, via the proxy 103 that accumulates intermediate data will be described next with reference to FIG. 3A.

The client 101 is connected to the camera 102 on the Internet via the proxy 103. First, the client 101 sends a stream request (step 300). Upon receiving the stream request, the proxy 103 directly sends the stream request to the camera 102 (step 310). Upon receiving the stream request (step 320), the camera 102 returns a video obtained by photographing in a stream video format (step 321). At this time, the camera 102 continuously sends a video stream as intermediate data added with no end information in, for example, the chunk format. Since data added with end data is never sent from the camera 102, the proxy 103 only accumulates stream data as intermediate data, and does not send the video to the client 101 (step 311). As a result, the client 101 can never receive the video, and thus cannot display the video (step 301).

FIG. 4 is a block diagram showing an example of the functional arrangements of the client 101 and camera 102 according to this embodiment. The client 101 executes reception processing of receiving a video from the camera 102 as an external apparatus.

In this embodiment, the client 101 and the camera 102 are connected by a network 450 via a proxy (not shown). The numbers of clients and cameras connected to the network 450 are not limited. However, for the sake of descriptive simplicity, assume that one client and one camera are connected. As for the network 450, any digital network such as the Internet or an intranet with a band enough to pass a camera control signal and compressed image signal (to be described later) may be used. Note that a TCP/IP (UDP/IP) protocol is assumed as a network protocol in this embodiment, and an address indicates an IP address in the following description. Assume that the client 101 and the camera 102 are assigned with IP addresses.

The camera 102 according to this embodiment is a camera server apparatus having a camera function and a server function of distributing a video. Note that the camera function and the server function may be implemented by separate apparatuses or one apparatus. In accordance with a command received from the client by a communication control unit 414, the camera 102 distributes image data via the network 450, and also executes various camera control operations. An image input unit 415 loads a photographed image (moving image or still image) of a video camera 411. The image input unit 415 loads an entire image if it is set to process an entire image, and loads part of an image if it is set to process a cut image. An image compressing unit 416 compresses the loaded photographed image to a data size that is readily distributed to the client 101. A storage unit 418 holds various setting values and data.

The video camera 411 is attached to a movable panhead 412. A camera/panhead control unit 413 controls the movable panhead 412 in accordance with control contents designated by a command that has been received by the communication control unit 414 and interpreted by a command interpretation unit 417. This controls, for example, the pan, tilt, and rotation angles of the video camera 411.

When authentication information is sent via the communication control unit 414, an authentication unit 419 determines whether to permit authentication. The camera 102 has guest and administrator user operation modes, and executable functions are different depending on a guest or an administrator. The authentication unit 419 performs authentication using a character string and password input by the user. If authentication succeeds, the authentication unit 419 certifies the user as an administrator, and transits to the administrator operation mode. In the administrator operation mode, a function or the like that can be performed only by the administrator is accepted.

The image compressing unit 416 receives an NTSC image signal from the video camera 411, performs A/D conversion, compresses the signal by MotionJPEG, and transfers the compressed signal to the communication control unit 414. The communication control unit 414 sends the compressed image to the network 450. Note that MotionJPEG compression is used as the compression format of the image. However, the present invention is not limited to this compression format. The camera 102 supports both stream distribution of distributing a video stream by one stream request and individual distribution of sending one image (individual image) by one individual request.

The client 101 designates the IP address assigned to the camera 102, and is connected to the camera 102 via the network 450, thereby establishing communication. A communication control unit 421 of the client 101 receives photographed image data (video stream or individual image) sent from the camera 102, and panoramic image data held in the storage unit 418. The communication control unit 421 also receives the results of various camera control operations from the camera 102. A control unit 424 controls various kinds of operations including the operation of the client 101 in a stream reception mode and the operation of the client 101 in an individual reception mode. The control unit 424 executes reception processing (to be described later with reference to FIGS. 9A and 9B). The control unit 424 controls to generate a graphical user interface (GUI) from the results of the various camera control operations and the photographed image and panoramic image expanded by an image decompression unit 425, and displays the GUI on a display unit 426. An operation input unit 423 accepts a GUI operation performed by the user via a mouse or keyboard. A command generation unit 422 generates various camera control commands based on GUI operations such as a mouse click operation on the panoramic image and a drag operation of a frame representing the pan, tilt, rotation, and zoom positions of the video camera 411. The command generation unit 422 also generates a command of the size of a received image, a cut distribution command, and the like. The generated various camera control commands are sent from the communication control unit 421 to the camera 102. A timer 430 measures a time since issuance of the stream request. The timer 430 is used to determine a time-out of display control.

Figure 12:
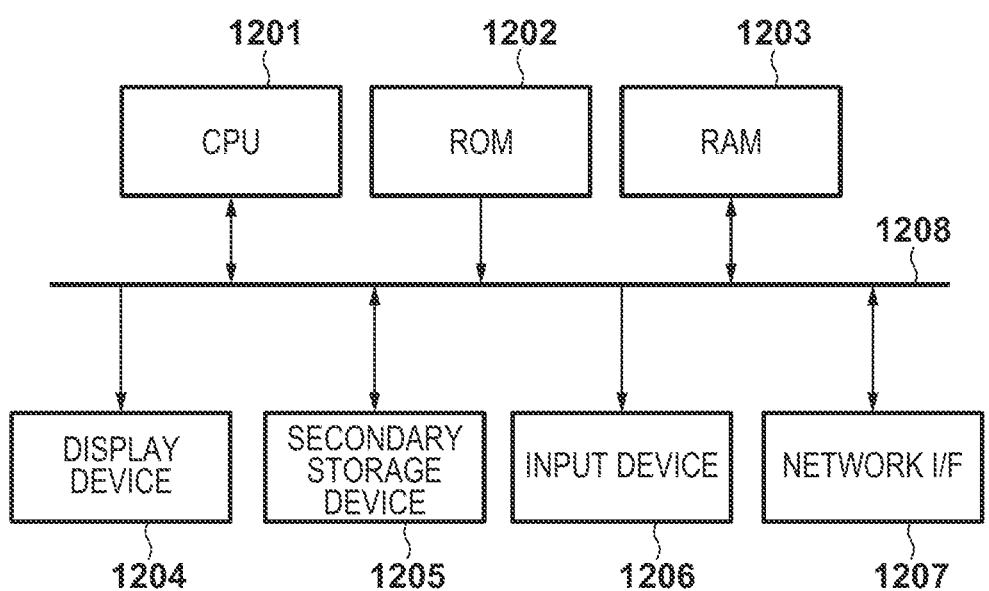
FIG. 12 is a block diagram showing an example of the hardware arrangement of the client according to the embodiment.

FIG. 12 is a block diagram showing an example of the hardware arrangement of the client 101. The client 101 is an information processing apparatus, and is implemented by, for example, a general-purpose computer apparatus. A CPU 1201 implements various control operations by executing programs stored in a ROM 1202 or a RAM 1203. The ROM 1202 and the RAM 1203 are examples of a memory connected to the CPU 1201. The ROM 1202 is a read-only nonvolatile memory. The RAM 1203 is a volatile memory that is appropriately writable. At least some of the functional units of the client 101 shown in FIG. 4 are implemented when the CPU 1201 executes predetermined programs.

A display device 1204 forms the display unit 426, and performs various display operations under the control of the CPU 1201. A secondary storage device 1205 is, for example, a hard disk, and saves various kinds of data. Note that a program to be executed by the CPU 1201 may be stored in the secondary storage device 1205, and loaded into the RAM 1203 and executed by the CPU 1201, as needed. An input device 1206 includes a keyboard and a mouse, and forms the operation input unit 423. Note that the input device 1206 may include a touch panel provided on the display screen of the display device 1204. A network interface 1207 is an interface that connects the network 450 and the client 101. The above-described constituent elements are communicably connected to each other via a bus 1208.

Figure 5:
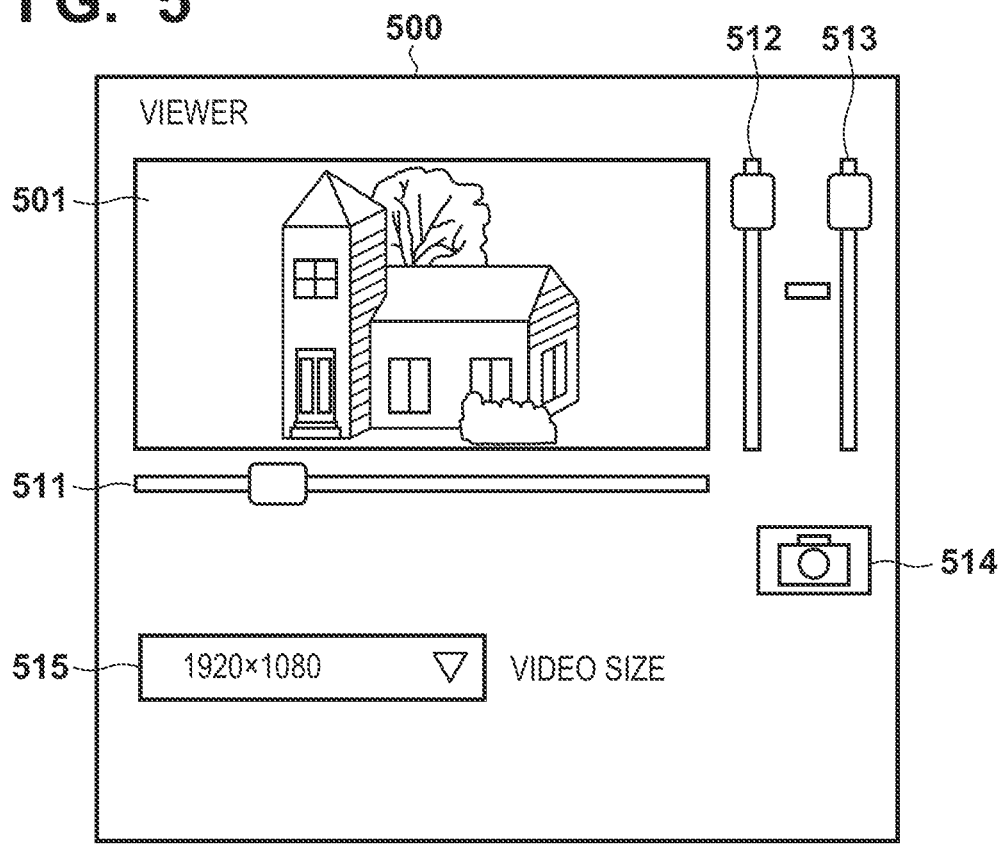
FIG. 5 is a view showing a viewer window displayed on the client.

A GUI window (viewer window 500) according to this embodiment will be described next with reference to FIG. 5. In the viewer window 500, a video distributed from the camera 102 is displayed in a video display area 501. Pan, tilt, and zoom operations can be performed using operation bars 511, 512, and 513. A snapshot button 514 is used to obtain a still image. An image size setting selector 515 is used to display a current video size and switch a video size to be displayed. It is possible to display, in the video display area 501, an image obtained by stream distribution described with reference to FIG. 1A and an image obtained by individual distribution described with reference to FIG. 1B.

The reception operation of the client 101 according to this embodiment will be described next. The client 101 determines the reception state of a video by requesting the camera 102 as an external apparatus to send the video, and executes one of a stream reception operation and an individual reception operation based on a determination result. In this embodiment, it is determined whether a video stream is received within a predetermined time since sending of a stream request, and one of the stream reception operation and the individual reception operation is selected based on a determination result. Exchange of the video between the client 101 and the camera 102 according to this embodiment will be described below with reference to FIG. 6.

Figure 6:
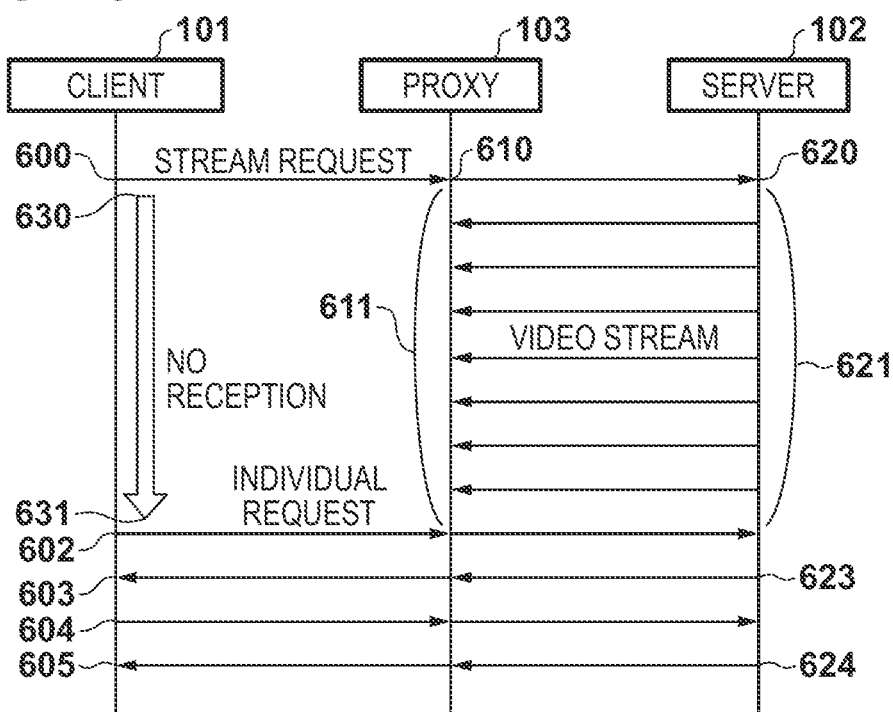
FIG. 6 is a sequence chart for explaining the operations of the client, proxy, and camera according to the first embodiment.

The reception processing (viewer) operating on the client 101 according to this embodiment sends a stream request to the camera. The client 101 normally receives a video stream and displays a video in the procedure shown in FIG. 1A. To the contrary, an operation sequence shown in FIG. 6 shows an operation when the proxy 103 that accumulates divided data and then sends the data at once is interposed between the client 101 and the camera 102, as described with reference to FIGS. 3A and 3B. The client 101 sends a stream request to the camera 102 (step 600). Upon receiving the request, the proxy 103 directly sends the request to the camera 102 (step 610). Thus, the stream request sent from the client 101 is received by the camera 102 via the proxy 103 (step 620). The camera 102 distributes a video stream in response to the stream request (step 621). The distributed video stream includes intermediate data, and the proxy 103 accumulates the intermediate data (step 611). Therefore, the client 101 receives no video.

After sending the stream request, the client 101 activates the timer 430 (step 630) to measure an elapsed time since sending of the stream request. If no video stream is received before the value of the timer 430 reaches a predetermined value (for example, 3 sec) (step 631), the client 101 starts to send an individual request in order to receive an image by individual distribution (step 602). Upon receiving the individual request via the proxy 103, the camera 102 sends an image (step 623). The sent image is received by the client 101 via the proxy 103, and displayed in the video display area 501 (step 603). If an individual image is sent, it is not in a divided data format, and is not accumulated in the proxy 103. When individual distribution described above is repeated (steps 604, 624, and 605), the client 101 can receive the images distributed by the camera 102, and displays them as a video.

Figure 7:
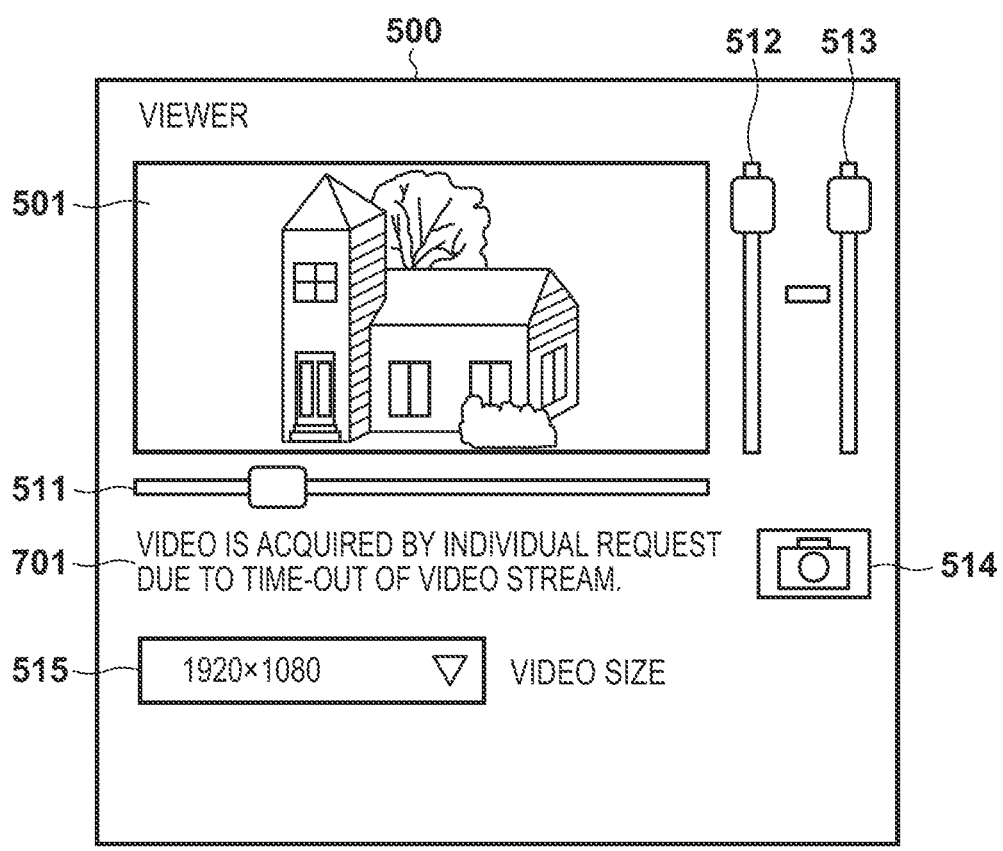
FIG. 7 is a view showing a viewer window displayed on the client.

FIG. 7 is a view showing a GUI when a video is displayed by individual distribution in step 602 and the subsequent steps of FIG. 6. As shown in FIG. 7, the images received by individual distribution are displayed in the video display area 501. In an area 701, "video is acquired by individual request due to time-out of video stream" is displayed, explicitly indicating to the user that stream distribution has been switched to individual distribution. With this display, the user can grasp whether the client 101 executes the stream reception operation of receiving a video stream in response to a stream request or the individual reception operation of receiving an individual image in response to an individual request.

FIG. 8A shows exchange when, if reception processing ends after a time-out occurs to switch to individual distribution, as shown in FIG. 6, and then reception processing is activated, the client 101 acquires an image from the camera 102. In this case, if the same sequence as that shown in FIG. 6 is performed again, that is, a video stream is to be received by a stream request, the possibility that a time-out of the timer 430 (3 sec) occurs without receiving a video is high. For this reason, from the beginning, the client 101 receives a video by individual distribution described with reference to FIG. 1B and displays it. That is, upon activation of reception processing, the client 101 sends an individual request (steps 800, 802, and 804). The camera 102 receives the individual request (steps 820, 822, and 824), and sends an image (steps 821, 823, and 825). The client 101 receives and displays the image (steps 801, 803, and 805).

Note that as shown in FIG. 8A, switching of the processing to individual distribution from beginning is preferably limited to a case in which an image can be displayed by switching to an individual request, as shown in FIG. 6. The reason for this is as follows. As shown in FIG. 8B, after sending a stream request (step 840), if a time-out occurs without receiving a video, the client 101 sends an individual request (steps 841 and 842). As shown in FIG. 8B, if the camera 102 does not reply to the individual request either, it is considered that a malfunction has occurred in the camera 102. After eliminating the malfunction in the camera 102, it is desirable to attempt stream distribution first to perform reception by stream reception that allows high-speed video display.

Figure 9A:
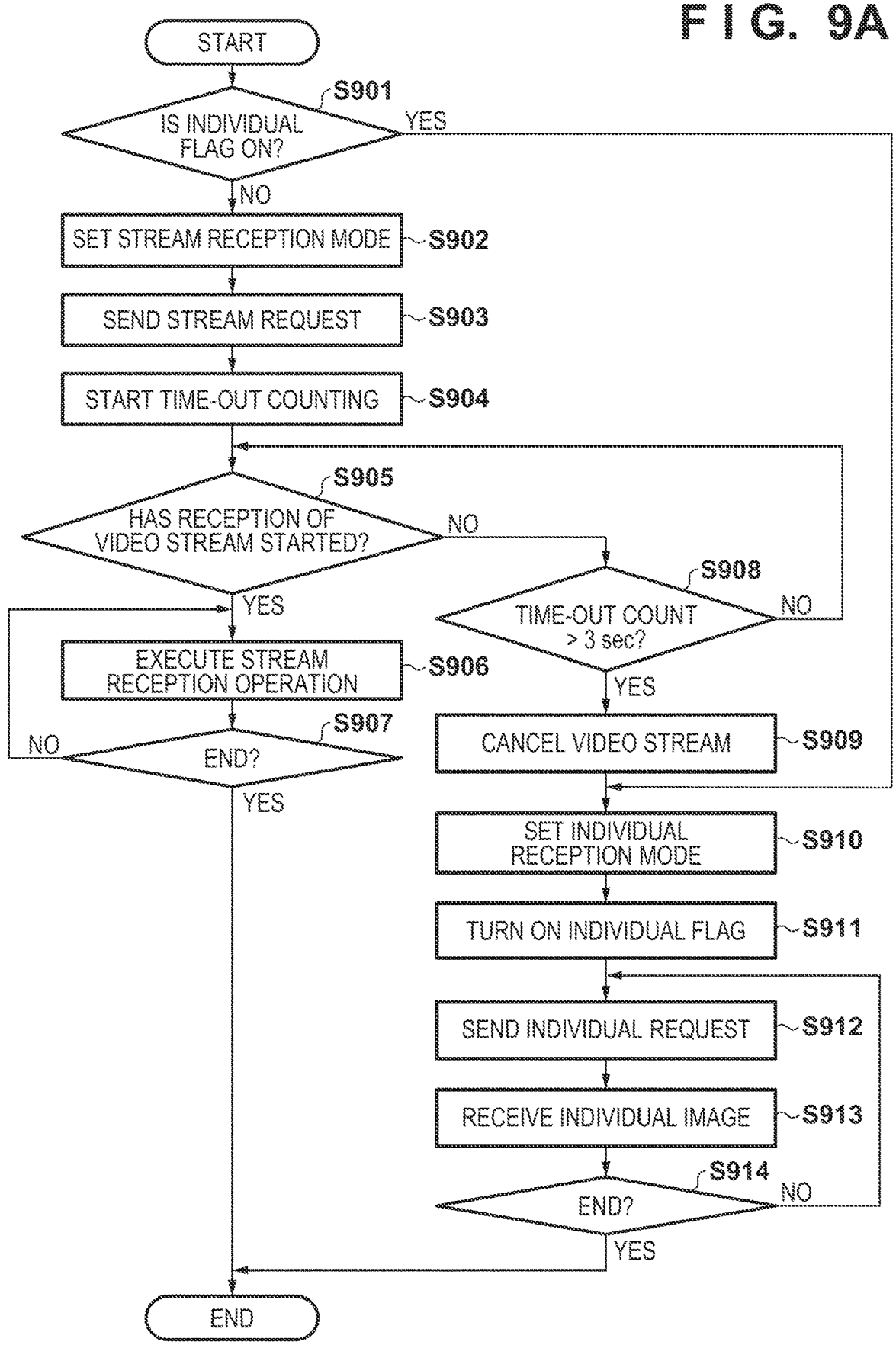
FIG. 9A is a flowchart illustrating reception processing according to the first embodiment.

The above-described processing will be further explained with reference to the flowchart of FIG. 9A. FIG. 9A shows processing (reception processing) started in the client 101 when the viewer shown in FIG. 5 is opened.

In step S901, the control unit 424 determines whether an individual flag is ON. This individual flag is OFF at the beginning. A timing when the individual flag is turned on will be described later. If it is determined in step S901 that the individual flag is not ON, the control unit 424 sets, in step S902, a reception mode to a stream reception mode to prepare for reception of a video stream in order to receive a stream distributed by stream distribution. The control unit 424 sends, in step S903, a stream request to the camera 102, and activates, in step S904, the timer 430 to start measurement (time-out counting) of an elapsed time since sending of the stream request.

In step S905, the control unit 424 determines whether reception of the video stream has started. If it is determined in step S905 that reception of the video stream has not started, the control unit 424 determines in step S908 whether the time-out count started in step S904 exceeds 3 sec. If the time-out count is equal to or shorter than 3 sec, the processing in step S905 is repeated.

If it is determined in step S905 that reception of the video stream has started, the control unit 424 continues the stream reception operation in step S906. That is, the stream reception operation in the stream reception mode set in step S901 is continued. In step S907, it is determined whether the stream reception operation ends. If it is determined in step S907 that the stream reception operation ends, this processing ends; otherwise, the stream reception operation in step S906 is repeated. The end of the stream reception operation indicates closing of the application of the viewer or the like.

On the other hand, if it is determined in step S908 that the time-out count is longer than 3 sec, it is determined that the proxy which accumulates intermediate data is interposed, and the control unit 424 cancels the video stream in step S909. In step S910, the control unit 424 sets the reception mode to an individual reception mode for receiving an image by individual distribution. In the individual reception mode, the control unit 424 receives an individual image by an individual request for individually requesting an image included in a video stream, and displays it. More detailed description will be provided below.

In step S911, the control unit 424 turns on the individual flag. If the individual flag is ON, an operation by individual distribution is executed at the time of next activation, as indicated by step S901. In step S912, the control unit 424 requests an individual image by sending an individual request. In step S913, the control unit 424 receives and displays the individual image. In step S914, the control unit 424 determines whether the individual reception operation ends. If it is determined that the individual reception operation ends, this processing ends; otherwise, the processes in step S912 and the subsequent steps are repeated. If the reception processing ends in a state in which the individual flag is ON, that is, the individual reception operation is executed, it is preferable to execute the individual reception operation without performing determination using a stream request at the time of next activation of the reception processing. This is because the possibility that a time-out occurs due to interposition of the proxy 103 is high even if a stream request is sent. Therefore, in the reception processing of this embodiment, if the individual flag is ON at the time of activation, the client 101 operates in the individual reception mode from the beginning (YES in step S901→step S910).

Figure 9B:
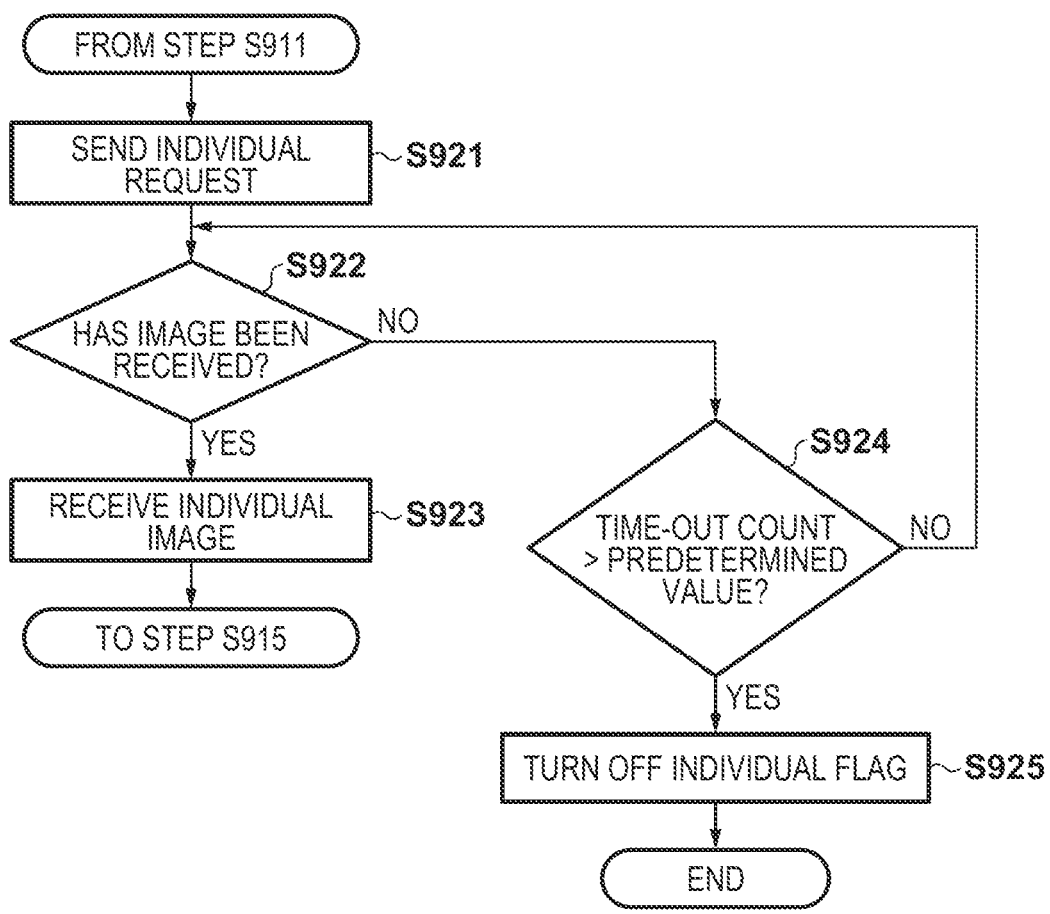
FIG. 9B is a flowchart illustrating the reception processing according to the first embodiment.

As described above, if the camera 102 does not reply to the individual request either, it is considered that a malfunction has occurred in the camera 102. In this case, after eliminating the malfunction, the user may want to perform reception by stream reception that allows high-speed video display. Therefore, if an image for the individual request is not received within the predetermined time in step S913, the control unit 424 turns off the individual flag turned on in step S911, thereby ending the processing. FIG. 9B shows this processing. Steps S921 to S925 of FIG. 9B show details of the processes in steps S912 and S913. The control unit 424 sends an individual request in step S921 while activating the timer 430 to start time-out counting. In step S922, the control unit 424 determines whether an image for the individual request has been received. If the image has been received, the control unit 424 receives the individual image in step S923. On the other hand, if it is determined in step S922 that no image has been received, the control unit 424 determines in step S924 whether the time-out count exceeds a predetermined value. If the time-out count is equal to or smaller than the predetermined value, the process returns to step S922. If it is determined in step S924 that the time-out count exceeds the predetermined value, the control unit 424 turns off the individual flag in step S925, thereby ending the reception processing. If the image can be received by executing the individual reception operation, the individual reception mode is set from the beginning at the time of next activation of the reception processing. If no image can be received even by executing the individual reception operation, the stream reception mode is set at the time of next activation of the reception processing to perform determination in steps S903 to S908.

As described above, according to the first embodiment, if a proxy server that accumulates a video is interposed midway, it is possible to switch from the operation of receiving and displaying a video stream to the operation of receiving and displaying an individual image. Therefore, it is possible to see a video from a camera in either an environment where such proxy is interposed or an environment where no such proxy is interposed.

Second Embodiment

In the first embodiment, control is performed to switch to reception of a video by an individual request if reception of a video stream cannot be started within a predetermined time since sending of a stream request. In the second embodiment, one of stream distribution and individual distribution is selected based on a time taken for arrival of an individual image by an individual request and a time taken for arrival of a video stream by a partial stream request. Note that the arrangements of a client 101 and a camera 102 and the basic operations of stream distribution and individual distribution according to the second embodiment are the same as in the first embodiment.

Figure 10A:
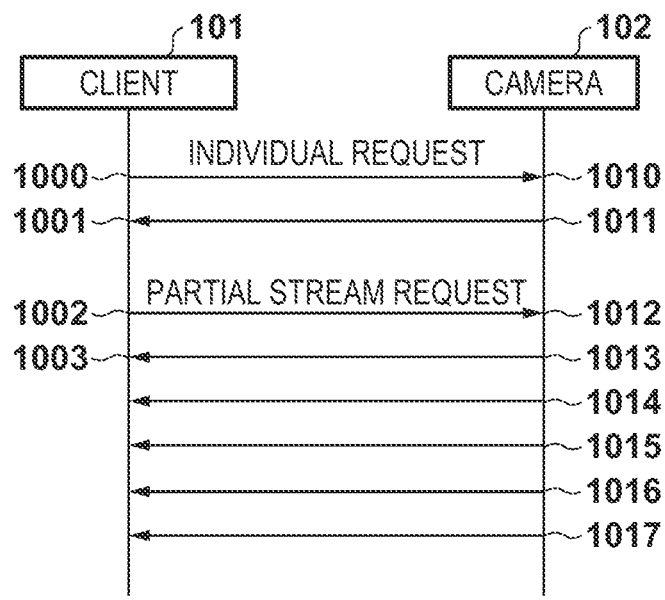
FIGS. 10A and 10B are sequence charts for explaining the operations of a client, proxy, and camera according to the second embodiment.
Figure 10B:
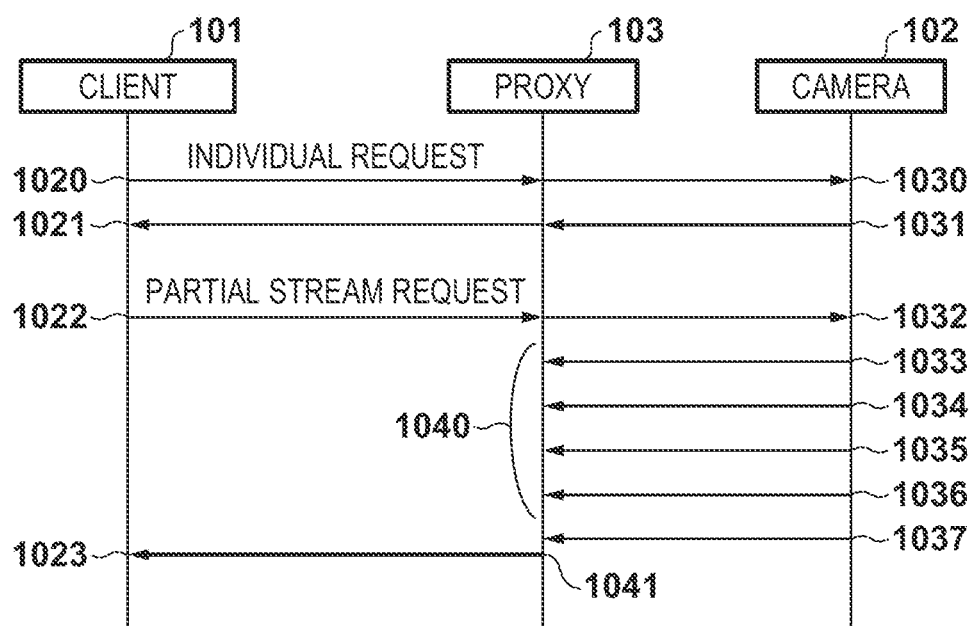

FIGS. 10A and 10B are sequence charts each showing exchange between the camera 102 and the client 101 before requesting actual distribution of a video according to the second embodiment. With this processing, before requesting actual distribution, it is determined whether an environment is that where a proxy that accumulates intermediate data is interposed, as shown in FIGS. 2A and 2B or 3A and 3B. This processing will be referred to as environment determination processing hereinafter. The environment determination processing allows the client 101 to decide, before execution of actual video distribution (to be referred to as actual distribution hereinafter) by the camera 102, whether actual distribution is performed by stream distribution or individual distribution.

A method of determining, by the environment determination processing, whether a proxy 103 that accumulates intermediate data is interposed will be described. In the case of an individual request, even if a proxy set to accumulate intermediate data is interposed, a reply is received soon from the camera 102. On the other hand, in the case of stream distribution, if a proxy set to accumulate intermediate data is interposed, data are returned when all the data are accumulated, and thus it takes time for the first data to return. Using this fact, if the difference between the time from sending of an individual request to the first reply and the time from sending of a stream request to the first reply is large, it is determined that the proxy accumulates data midway.

FIG. 10A is a sequence chart when this determination processing is performed in a network environment where the proxy that accumulates intermediate data is not interposed. The client 101 sends an individual request (step 1000). Upon receiving the individual request (step 1010), the camera 102 sends a reply (individual image) to the individual request (step 1011). The client 101 receives the reply (step 1001), and holds, as the first time, the time from sending (step 1000) of the individual request to reception (step 1001) of the reply. Next, the client 101 sends a partial stream request (step 1002). The partial stream request is used to cause the camera 102 to distribute a stream of a predetermined data amount. In this embodiment, assume that a predetermined number of video streams, for example, five video streams are distributed. Upon receiving the partial stream request (step 1012), the camera 102 returns requested partial streams (five videos) (steps 1013 to 1017). The client 101 receives the videos sent from the camera 102 (steps 1003 to 1007). The client 101 obtains, as the second time, the time from sending (step 1002) of the partial stream request to reception (step 1003) of the first video.

In this embodiment, in the environment determination processing, it is decided whether to execute a stream reception operation or an individual reception operation, based on the ratio or difference between the first time and the second time. For example, if the difference between the first time and the second time is equal to or smaller than a threshold, or a value obtained by dividing the first time by the second time is equal to or larger than a predetermined value, it is decided to execute a stream reception operation. In FIG. 10A, since the difference between the held first time from step 1000 to step 1001 and the second time from step 1002 to step 1003 is small, it is determined that the environment is a normal environment (an environment where the proxy that accumulates data is not interposed). Note that if the decision processing is performed using the ratio between the first time and the second time, when the first time differs from the second time by less than twice, it is determined that the difference between the first time and the second time is small.

A case in which the same processing as that shown in FIG. 10A is performed in a state in which the proxy that accumulates intermediate data is interposed will be described next with reference to FIG. 10B. First, the client 101 sends an individual request to the camera 102 (step 1020). The camera 102 receives the request (step 1030), and sends a reply (individual image) to the received request (step 1031). The client 101 receives the reply (step 1021). The client 101 obtains the time from sending (step 1020) of the individual request to reception (step 1021) of the reply, and holds it as the first time.

Next, the client 101 sends a partial stream request (step 1022). The partial stream request is as described above. Upon receiving the partial stream request (step 1032), the camera 102 returns requested partial streams (steps 1033 to 1037). The proxy 103 accumulates these partial streams until a partial stream with end information arrives (step 1040). Upon receiving the partial stream with end information, the proxy sends all the accumulated partial streams to the client 101 (step 1041). The client 101 receives the partial streams as a reply to the partial stream request (step 1023). The client 101 obtains the second time from sending (step 1022) of the partial stream request to reception (step 1023) of the reply. In the case shown in FIG. 10B, since the difference between the first time from step 1020 to step 1021 and the second time from step 1022 to step 1023 is large, it is determined that the environment is an environment where the proxy that accumulates data is interposed. As described above, if the first time differs from the second time by twice or more, it is determined that the difference between the first time and the second time is large.

Figure 11:
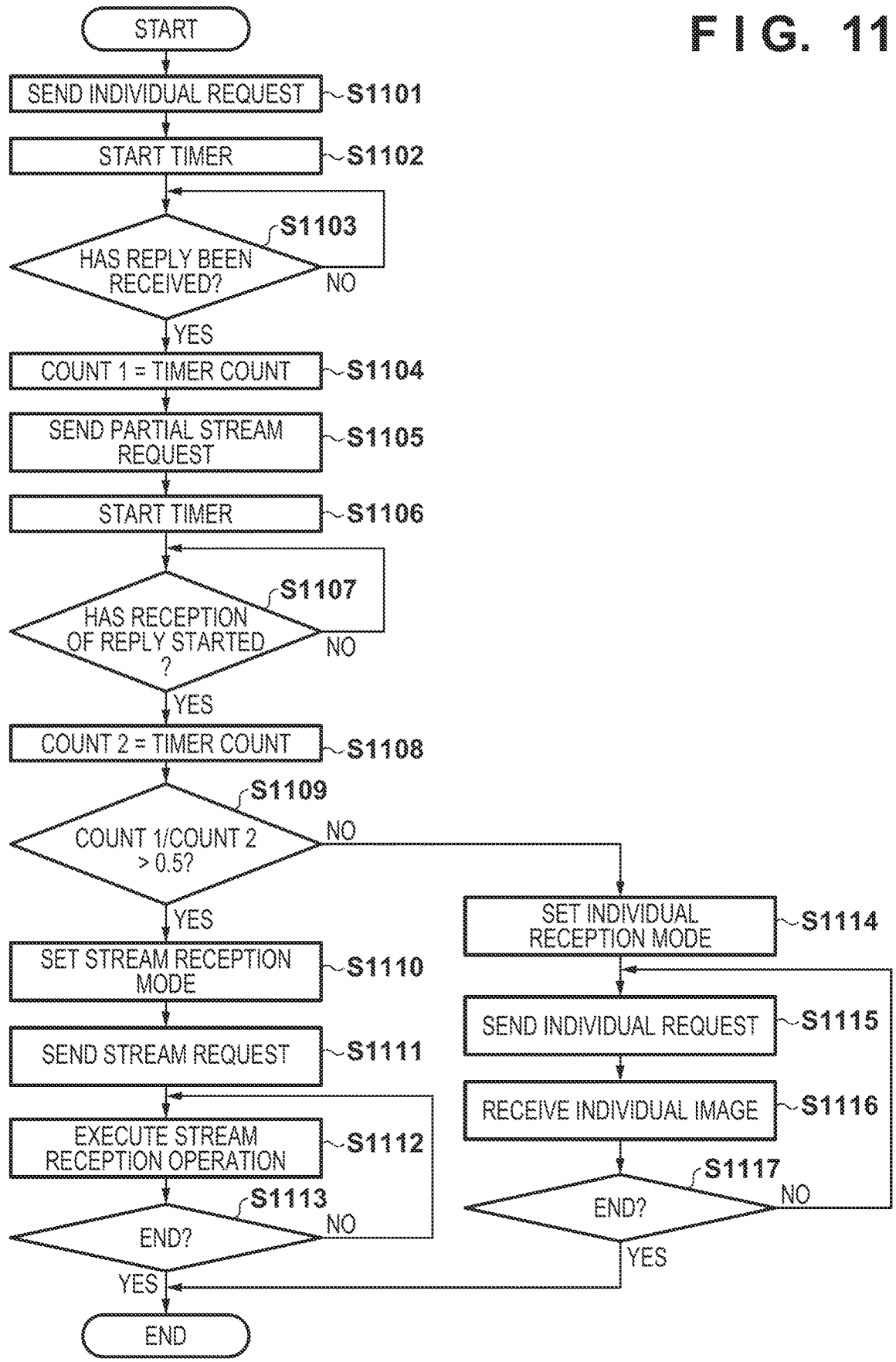
FIG. 11 is a flowchart illustrating reception processing according to the second embodiment.

Viewer reception processing by the client 101 according to the second embodiment including the above-described environment determination processing will be explained with reference to the flowchart of FIG. 11. In FIG. 11, steps S1101 to S1109 correspond to the environment determination processing.

In step S1101, a control unit 424 sends an individual request. In step S1102, a timer 430 is activated. At this time, the timer 430 starts to perform counting from 0. In step S1103, the control unit 424 determines whether a reply to the request sent in step S1101 has been received. Step S1103 is repeated until the reply is received. If it is determined in step S1103 that the replay has been received, the control unit 424 substitutes, in step S1104, the value (to be referred to as a timer count hereinafter) of the timer 430 into count 1. As a result, the time from sending of the individual request to reception of the reply is set in count 1.

In step S1105, the control unit 424 sends a partial stream request to the camera 102. In step S1106, the control unit 424 starts the timer 430. The timer 430 is started from 0. After that, in step S1107, the control unit 424 waits for reception of the first reply to the partial stream request. If the reply is received, the control unit 424 substitutes, in step S1108, the current timer count into count 2. As a result, the time from sending of the partial stream request to reception of the first reply is set in count 2.

In step S1109, the control unit 424 compares the times held in counts 1 and 2, and determines whether a value of count 1/count 2 is larger than 0.5. That is, it is determined whether the first time taken to receive the reply to the individual request is not so different from the second time taken to receive the reply to the partial stream request. If it is determined in step S1109 that the value is larger than 0.5, it is determined that there is no large difference between the times of counts 1 and 2, that is, the proxy 103 that accumulates intermediate data is not interposed. In this case, the process advances to step S1110, actual distribution is performed using video stream distribution. That is, the control unit 424 sets, in step S1110, the reception mode to the stream reception mode of receiving a video stream, and sends a stream request in step S1111. In step S1112, the control unit 424 receives and displays a video stream. Step S1112 is repeated until distribution of the video stream ends (step S1113).

On the other hand, if it is determined in step S1109 that the value is equal to or smaller than 0.5, the process advances to step S1114, and actual distribution is performed using individual distribution. That is, in step S1114, the control unit 424 sets the reception mode to the individual reception mode of individually receiving an image by an individual request. The control unit 424 sends an individual request in step S1115, and receives and displays an individual image in step S1116. In step S1117, the control unit 424 determines whether individual distribution ends. If it is determined that individual distribution ends, this processing ends; otherwise, the process returns to step S1115, and steps S1115 to S1117 are repeated until individual distribution ends. Note that the processing shown in FIG. 9B may be applied as the processes in steps S1115 and S1116, similarly to steps S912 and S913 of the first embodiment.

As described above, in the second embodiment, it is determined whether the proxy that accumulates data (images) is interposed, by comparing the times taken to receive replies to an individual request and a partial stream request before causing the camera to start actual distribution of a video. In the second embodiment, since it is decided based on a determination result whether to perform individual distribution or stream distribution, it is possible to receive a video in an appropriate reception mode from the start of a viewer operation.

Note that in the above example, in each of distribution by an individual request and distribution by a partial stream request executed in the environment determination processing before actual distribution, a video photographed by the camera 102 is used as a reply to the request. However, the present invention is not limited to this. In the environment determination processing, predetermined data other than a video and image may be used as a reply to the request.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-173222, filed Sep. 8, 2017, which is hereby incorporated by reference herein in its entirety.

What is claimed is:

1. An information processing apparatus for executing reception processing for receiving a video from an external apparatus, comprising a computer executing instructions that, when executed by the computer, cause the computer to function as:

an execution unit configured to execute a stream reception operation for receiving the video as a video stream by sending a stream request to the external apparatus;

a determination unit configured to perform determination for determining whether the video stream is received from the external apparatus within a predetermined time since the execution unit sends the stream request to the external apparatus, and a display control unit, wherein the execution unit is configured to execute, if the determination unit determines that the video stream is not received within the predetermined time, an individual reception operation for individually receiving a plurality of images included in the video by sending a plurality of individual requests to the external apparatus, wherein the display control unit is configured to cause a display device:

to display the video based on at least one of the video stream and the plurality of images; and to display information for indicating which of the stream reception operation and the individual reception operation is currently executed.

2. The apparatus according to claim 1, wherein the execution unit starts, if the determination unit determines that the video stream is not received within the predetermined time, the individual reception operation by canceling the stream request.

3. The apparatus according to claim 1, wherein the determination unit measures a first time from sending of the individual request to reception of a reply to the individual request and a second time from sending of a partial stream request for sending a stream of a predetermined data amount to reception of a reply to the partial stream request, and the execution unit decides, based on the first time and the second time, which of the stream reception operation and the individual reception operation is to be executed.

4. The apparatus according to claim 3, wherein the execution unit decides, based on one of a ratio and a difference between the first time and the second time, which of the stream reception operation and the individual reception operation is to be executed.

5. The apparatus according to claim 3, wherein the reply to the individual request includes an individual image imaged by the external apparatus, and the reply to the partial stream request includes a predetermined number of video streams imaged by the external apparatus.

6. The apparatus according to claim 3, wherein if a value obtained by dividing the first time by the second time is not smaller than a predetermined value, the execution unit decides to execute the stream reception operation.

7. The apparatus according to claim 3, wherein if a difference between the first time and the second time is not larger than a threshold, the execution unit decides to execute the stream reception operation.

8. A control method for an information processing apparatus for executing reception processing for receiving a video from an external apparatus, comprising:

executing a stream reception operation for receiving the video as a video stream by sending a stream request to the external apparatus;

performing a determination for determining whether the video stream is received from the external apparatus within a predetermined time since the sending of the stream request to the external apparatus, executing, if it is determined that the video stream is not received within the predetermined time, an individual reception operation for individually receiving a plurality of images included in the video by sending a plurality of individual requests to the external apparatus, and causing a display device to:

display the video based on at least one of the video stream and the plurality of images; and display information for indicating which of the stream reception operation and the individual reception operation is currently executed.

9. A non-transitory computer readable storage medium storing a program for causing a computer to execute a control method for an information processing apparatus for executing reception processing of receiving a video from an external apparatus, the method comprising:

executing a stream reception operation for receiving the video as a video stream by sending a stream request to the external apparatus;

performing a determination for determining whether the video stream is received from the external apparatus within a predetermined time since the sending of the stream request to the external apparatus, executing, if it is determined that the video stream is not received within the predetermined time, an individual reception operation for individually receiving a plurality of images included in the video by sending a plurality of individual requests to the external apparatus, and causing a display device to:

display the video based on at least one of the video stream and the plurality of images; and display information for indicating which of the stream reception operation and the individual reception operation is currently executed.

10. An information processing apparatus for executing reception processing for receiving a video from an external apparatus, comprising a computer executing instructions that, when executed by the computer, cause the computer to function as:

an execution unit configured to execute a stream reception operation for receiving the video as a video stream by sending a stream request to the external apparatus; a determination unit configured to perform determination for determining whether the video stream is received from the external apparatus within a predetermined time since the execution unit sends the stream request to the external apparatus, and a display control unit, wherein the execution unit is configured to execute, if the determination unit determines that the video stream is not received within the predetermined time, an individual reception operation for individually receiving a plurality of images included in the video by sending a plurality of individual requests to the external apparatus, wherein the display control unit is configured to cause a display device to display the video based on at least one of the video stream and the plurality of images, wherein, if the plurality of images has been received by the individual reception operation and the execution unit executes next reception processing, the execution unit executes the individual reception operation for the next reception processing without the determination by the determination unit, wherein, if the execution unit has executed the individual reception operation and the plurality of images has not been received, the execution unit firstly executes the stream reception operation for the next reception processing and the determination unit performs the determination for the next reception processing.

11. A control method for an information processing apparatus for executing reception processing for receiving a video from an external apparatus, the method comprising:
  executing a stream reception operation for receiving the video as a video stream by sending a stream request to the external apparatus;
  performing determination for determining whether the video stream is received from the external apparatus within a predetermined time since the sending of the stream request to the external apparatus;
  executing, if it is determined that the video stream is not received within the predetermined time, an individual reception operation for individually receiving a plurality of images included in the video by sending a plurality of individual requests to the external apparatus;
  causing a display device to display the video based on at least one of the video stream and the plurality of images;
  if the plurality of images has been received by the individual reception operation and the next reception processing is executed, executing the individual reception operation for the next reception processing without the determination; and
  if the individual reception operation is executed and the plurality of images has not been received, firstly executing the stream reception operation for the next reception processing and performing the determination for the next reception processing.

12. A non-transitory computer readable storage medium storing a program for causing a computer to execute a control method for an information processing apparatus for executing reception processing for receiving a video from an external apparatus, the method comprising:
  executing a stream reception operation for receiving the video as a video stream by sending a stream request to the external apparatus;
  performing determination for determining whether the video stream is received from the external apparatus within a predetermined time since the sending of the stream request to the external apparatus;
  executing, if it is determined that the video stream is not received within the predetermined time, an individual reception operation for individually receiving a plurality of images included in the video by sending a plurality of individual requests to the external apparatus;
  causing a display device to display the video based on at least one of the video stream and the plurality of images;
  if the plurality of images has been received by the individual reception operation and the next reception processing is executed, executing the individual reception operation for the next reception processing without the determination; and
  if the individual reception operation is executed and the plurality of images has not been received, firstly executing the stream reception operation for the next reception processing and performing the determination for the next reception processing.

* * * * *